Figure 1:
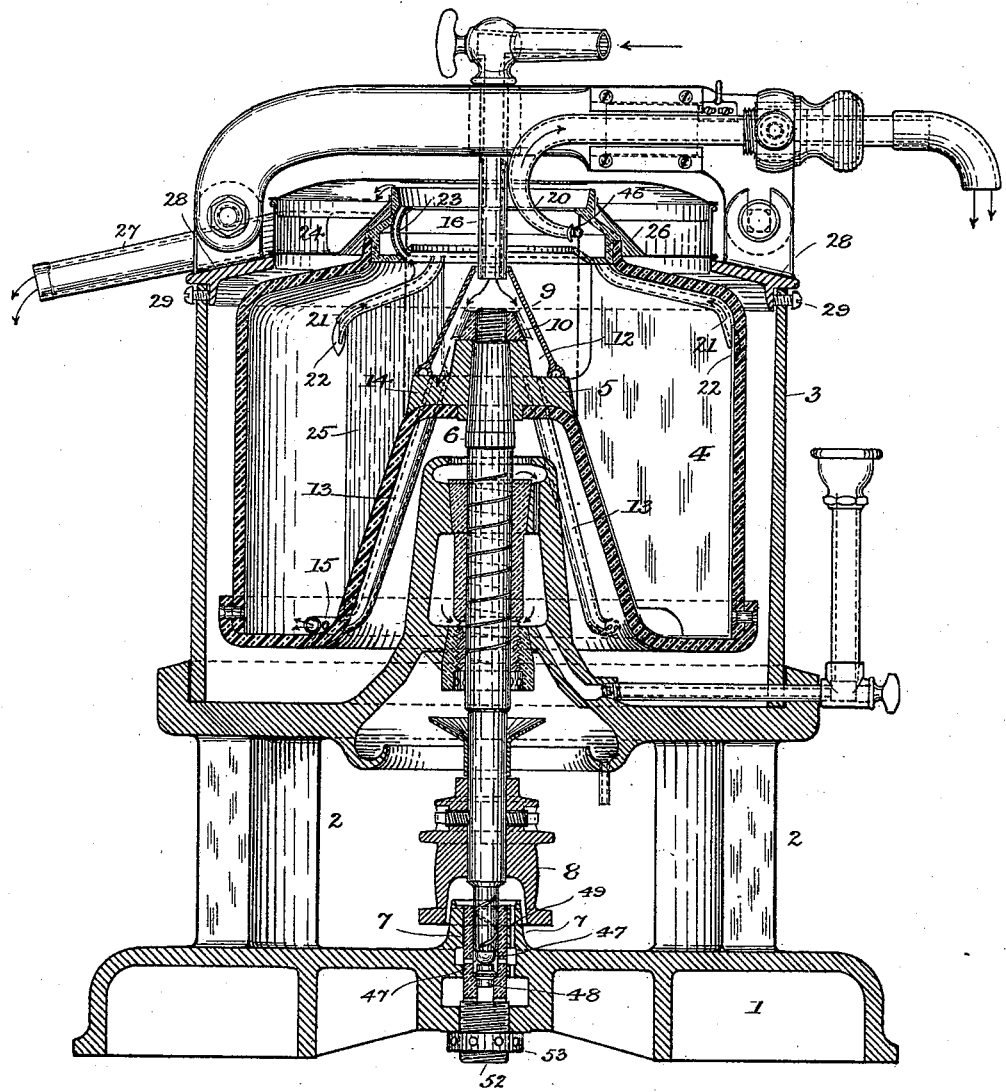

(No Model.) 3 Sheets—Sheet 1.

A. H. REID.
CENTRIFUGAL CREAMER.

No. 536,444. Patented Mar. 26, 1895.

Witnesses:
F. S. Elmore
Raymond F. Barnes

Inventor:
A. H. Reid
By Philip T. Dodge
Atty

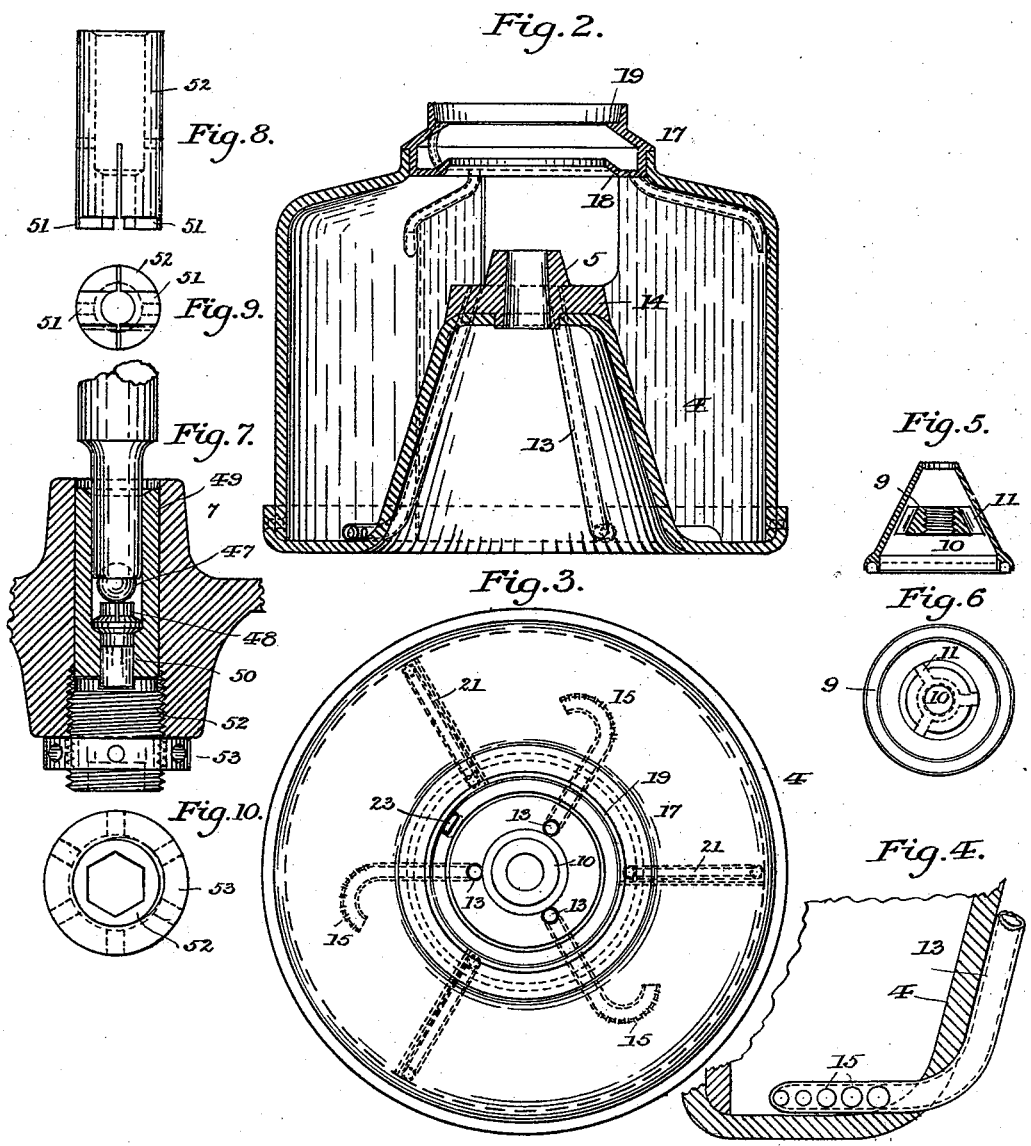

(No Model.) 3 Sheets—Sheet 3.
A. H. REID.
CENTRIFUGAL CREAMER.
No. 536,444. Patented Mar. 26, 1895.
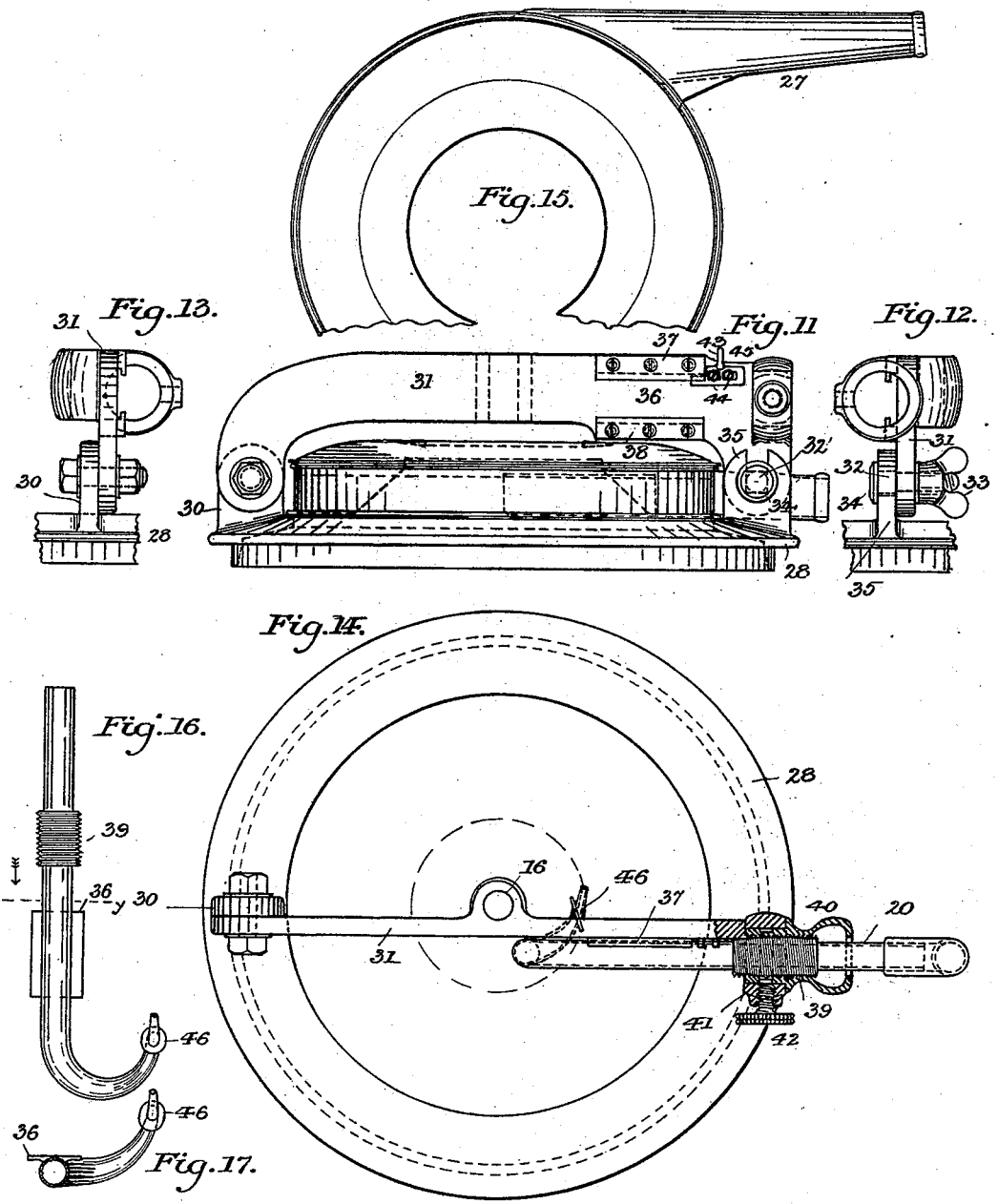
Witnesses:
G. S. Elmore
Raymond H. Barnes
Inventor:
A. H. Reid
By P. T. Dodge
Atty

UNITED STATES PATENT OFFICE.

ALBAN H. REID, OF PHILADELPHIA, PENNSYLVANIA.

CENTRIFUGAL CREAMER.

SPECIFICATION forming part of Letters Patent No. 536,444, dated March 26, 1895.

Application filed March 22, 1894. Serial No. 504,690. (No model.)

*To all whom it may concern:*

Be it known that I, ALBAN H. REID, of Philadelphia, county of Philadelphia, and State of Pennsylvania, have invented a new and useful Improvement in Centrifugal Creamers, of which the following is a specification.

My invention relates to liquid separators, and has reference more particularly to centrifugal creaming machines which consist of a rotary vessel for containing the milk and cream in their combined state, the rotation of the vessel acting by centrifugal force to cause the separation of the heavier milk and the lighter cream, the two being conveyed by suitable means to separate receiving vessels.

My invention consists in various improvements in machines of this nature designed to simplify the construction, render the action effective, and to improve the operation of the machine as a whole.

The invention also consists in the details of construction and combination of parts hereinafter described and claimed.

In the accompanying drawings, Figure 1 is a vertical longitudinal section through a centrifugal creamer constructed in accordance with my invention. Fig. 2 is a similar view of the rotary bowl detached. Fig. 3 is a top plan view of the same. Fig. 4 is a vertical cross section through one side of the bottom of the bowl on the line $x-x$ of Fig. 3, the supply pipe being shown straight at its end. Fig. 5 is a vertical central section through the hollow feeding cone. Fig. 6 is a bottom plan view of the same. Fig. 7 is a vertical central section through the lower end of the vertical driving shaft and its bearing. Figs. 8, 9, and 10 are details of the said bearing. Fig. 11 is a side elevation of the removable cover and its connected parts. Fig. 12 is a front end view of the cover and the arm for sustaining the feed tube and milk delivery tube. Fig. 13 is a rear end view of the same. Fig. 14 is a top plan view, partly in section, of the removable cover and adjacent parts. Fig. 15 is a top plan view of the annular cream receiving pan. Fig. 16 is a side elevation of the milk discharge pipe detached. Fig. 17 is a cross section of the same on the line $y-y$ of the preceding figure looking in the direction indicated by the arrow.

Referring to the drawings, 1 represents a frame or casting from which rise posts 2, which support a cylindrical casing 3.

4 represents a bowl for the reception of the milk to be separated, which bowl is located within the cylindrical casing, and has the central part of its bottom raised and inclined in the form of a truncated cone, the upper end of which is secured to the under side of a conical hub 5, which latter is fixed to the upper end of a vertical driving shaft 6. This shaft extends through the bottom of the cylindrical casing and is mounted at its lower end in a bearing 7, sustained by the frame, which bearing will be more fully described hereinafter. Between the casing and frame the shaft is provided with a driving pulley 8, by which motion is imparted to the shaft, and to the bowl connected thereto from any suitable source. From this description it will be understood that when the bowl is supplied with creamed milk and a rotary motion is given to it, the centrifugal force will cause the milk to separate from the cream, and the two liquids will form into two cylindrical walls, an outer "skimmed milk" wall, and an inner cream wall.

9 represents a hollow truncated feeding cone, preferably of brass, which is seated upon the upper end of the conical hub, and which is provided at its center with a nut 10, connected to the inner side of the cone by radial arms 11. This nut is screwed on to the extreme upper end of the shaft, which is threaded to receive the nut, the surrounding cone being of such size that an annular space 12 is left surrounding the upper end of the conical hub, as shown in Fig. 1. This annular surrounding space communicates with three pipes 13, which have their upper ends fixed in openings extending through a lateral flange 14, on the hub from which points the pipes extend downwardly along the outside of the conical bottom of the bowl to the base of the same, where they extend laterally through the wall of the bowl to its interior. At their ends the pipes are preferably bent in semi-circular form and provided with a series of discharge openings 15, shown in Fig. 3, the openings being arranged to discharge the milk which is supplied to the pipes beyond the cream wall.

The creamed milk to be separated is introduced through a vertical pipe 16, which has its lower end extending into the upper end of the hollow feeding cone, the milk flowing from said pipe between the radial arms 11 therein to the three pipes 13 and issuing from the perforated ends of the same into the base of the bowl. By introducing the milk into the bowl at this point by pipes having perforations, I am enabled to thoroughly and fully discharge the milk in a uniform manner without disturbing the rotary body of milk already in the bowl. It is not essential that the ends of the pipes be bent in semi-circular form as shown, though such an arrangement is preferable. As shown in Fig. 4, the pipes may be straight with openings arranged to discharge in a line with the rotation of the bowl. At its top the bowl is provided with an annular rim 17, preferably of brass, which at its lower end is formed with a lateral inwardly and upwardly extending flange 18, while above this flange a second flange 19 extends inward and upward from the rim near its top the two flanges 18 and 19 being substantially parallel to each other and forming between them an annular cup or trough with inwardly inclining walls. The annular space between the two flanges receives the skimmed milk as it is forced upward by the new supply constantly introduced, this skimmed milk being discharged through a pipe 20, the inner end of which projects into the space as shown in Fig. 1. The skimmed milk enters this annular space between the two flanges through pipes 21 located in the upper part of the bowl, which pipes have their outer ends arranged adjacent to the outer wall of the bowl within the skimmed milk wall, while their inner ends communicate through openings in the bottom flange 18 with the annular space above the same. Where the outer ends of these pipes terminate adjacent to the wall of the bowl, the latter is formed with rounding depressions or recesses 22, which will facilitate the introduction of tube cleaners and their passage through the pipes.

The cream flows through one or more pipes 23, which extends through the annular milk space between the flanges, as shown in Fig. 1, the lower end of the pipe projecting through an opening in the lower flange near its inner edge at a point within the cream wall with which it communicates, while the upper end of the pipe extends through an opening in the upper flange, from which point the cream will gently flow over the upper edge of the rim into an annular cream receiving vessel or pan 24. The cream pipe is bent back at its center, so as to escape the end of the milk pipe when the bowl is rotated, and it is slightly inclined outward,—that is, its upper or discharge end is slightly farther from the axis of rotation than the lower end, as seen in Fig. 1, the result of which is that the cream entering the pipe at the lower end is thrown outward by centrifugal action and is thereby drawn upward and freely discharged at the top, from whence it flows in a sheet over the outer wall of the milk chamber, which wall is also slightly inclined outward at the top, as shown. This manner of controlling the discharge of the cream is advantageous, in that by leading the cream through the milk space, as set forth, I am enabled to discharge it into the surrounding annular chamber, the cream in this manner flowing gently over the top of the rim of the bowl in the chamber, and not being forcibly driven through a discharge pipe, which latter action breaks up the cream, as it were, and causes the same to froth, thereby greatly impairing its quality.

Within the bowl I locate a series of vertical wings or blades 25, for the purpose of causing the liquid in the bowl to rotate as a body with the same. These wings, instead of terminating below the top of the bowl as has been the case heretofore, extend to the top of the same. In this way the entire body of cream will rotate with the bowl, so that there will be no churning action of the cream, as is the case where the blades terminate below the top of the cream wall.

The annular cream receiving chamber or pan 24, before alluded to, surrounds the rim of the bowl and is provided at its center with an upwardly extending inclined annular flange 26, the upper edge of which fits close around the rim of the bowl a slight distance below its top. The cream overflowing the rim of the bowl passes down this inclined flange to the bottom of the pan, whence it flows through a lateral discharge pipe 27, entering the side of the pan at a tangent, as shown in Figs. 1 and 15. The pan is removable and fits into the opening in a ring 28, which is seated on the upper edge of the cylindrical casing and secured therein by set screws 29, extending through the side of the casing and bearing against a downwardly extending flange on the ring. At one side the ring is formed with a vertical lug 30 to which is pivoted one end of a horizontal arm 31, the opposite end of which is bent downwardly and is provided with an opening to receive a horizontal bolt 32, which bolt at one end is provided with a clamping nut 33, while at its opposite end it is formed with a head 34. When the arm is in a horizontal position, the portion of the bolt between the lateral bent end of the arm and its head is adapted to enter a vertical slot in a lug 35 extending upward from the ring, the parts being held in this position by tightening up the nut, and thereby binding the end of the arm against the lug as shown in Fig. 12. The arm 31 sustains in fixed relations both the vertical feed pipe and the discharge pipe 20. The feed pipe is fixed in a vertical central opening in the arm in such position that when the latter is in a horizontal position, as shown in Fig. 1, the lower end of the feed pipe will extend a slight distance within the hollow feeding cone 9.

The milk discharge pipe curves from its inner end where it receives the skimmed milk upward, and extends laterally along the side of the arm, to which it is fixed in such manner as to be capable of longitudinal adjustment, and this in order that its end may be caused to extend a greater or less degree into the skimmed milk space according to the conditions encountered in practice.

To accomplish the longitudinal adjustment of the pipe, I fix to the side of the same a plate 36, the edges of which are mounted to slide in guiding grooves formed by the projecting edges of an upper and lower plate 37 and 38, which are fixed to the side of the arm, as shown in Figs. 1, 11, 12 and 13. Adjacent to the plate 36, the pipe is provided with a threaded sleeve 39, which is encircled by a tubular nut 40, which latter has its inner end seated loosely in a collar 41 fixed to the arm. The outer side of the nut within the collar is formed with an annular groove into which the end a screw 42 extends, this arrangement admitting of the rotation of the nut, but preventing its longitudinal movement. From this description it will be seen that when the tubular nut is turned, it will engage the threaded sleeve on the pipe and cause the latter to be moved inward or outward according as the nut is turned. When the pipe is in the proper position, the screw may be tightened up and will firmly hold the same.

In order that when adjusted to its proper position the pipe may be prevented from accidentally moving, I provide the arm with an adjustable stop 43 in the form of a plate fixed to the arm adjacent to the outer end of the upper plate 37. The stop plate is formed with two horizontal longitudinally extending slots through which two clamping screws 44 extend and into the arm. The inner edge of the plate extends into the guiding groove beneath the projecting edge of the upper plate, and is adapted to be fixed against the outer end of the plate 36 on the pipe when the latter is in its proper position, and in this way prevent the same from moving outward. This stop plate is provided on its upper edge with a finger 45, by which it is moved when it is to be adjusted. Near its inner end the skimmed milk pipe is provided with a lateral flange 46, inclined to the direction in which the receiving end of the pipe extends, and which serves to retard any spray of milk that may be caused by the passage of the end of the tube through the body of milk, and which throws the same back into the moving body of milk.

The bearing for the lower end of the vertical driving shaft comprises a ball or sphere 47, which is seated between the lower end of the shaft and a removable and reversible bearing plug 48. The lower end of the shaft is formed with a semi-spherical socket to receive the ball. A sleeve 49 seated in a vertical opening in the base frame, surrounds the shaft near its lower end, the said sleeve being formed at its lower end with a central opening, and a surrounding internal shoulder 50, the bearing plug 48 being seated in said opening and resting on the shoulder. The sleeve has oil holes a slight distance from its lower end and has on its extreme end on opposite sides, two lugs 51, which extend into corresponding recesses in the upper side of a nut 52 which is screwed upward into the lower end of the opening in the frame, and which gives support to the parts above. A binding nut 53 is screwed on to the first named nut to hold the same fixedly in position.

From the foregoing description it will be seen that the parts of the bearing may be adjusted to a nicety to compensate for wear, and that in the event of one end of the bearing plug becoming worn, it may be removed and reversed and its other end presented to the ball. The vertical shaft and the connected parts may by the construction described, be lifted upward after which the nut 52 may be removed and access thus had to the interior parts of the bearing for repairs or for other purposes.

Having thus described my invention, what I claim is—

1. In a centrifugal creamer the combination of the rotary bowl open at its upper end and provided at its top with an annular milk chamber open at its inner side, a milk pipe leading from the interior of the bowl near its outer side and communicating with the annular chamber, a cream pipe fixed to one side of the milk chamber and movable therewith extending through the bottom of the same upward therethrough and discharging over the upper edge of the bowl and means for discharging the milk from the annular chamber.

2. In a centrifugal creamer the combination of the rotary bowl the annular skimmed milk chamber mounted thereon, a pipe leading from the interior of the bowl into the bottom of said chamber, a fixed discharge pipe for conveying the milk from the chamber and a cream pipe communicating with the bowl and extending vertically through the skimmed milk chamber to discharge over the outer wall thereof, said pipe being slightly inclined outward from its lower end.

3. In a centrifugal creamer the combination of the rotary bowl the annular milk chamber mounted thereon, means for delivering the skimmed milk from the bowl into said chamber, a milk discharge pipe having its receiving end extending into the chamber and a cream discharge pipe extending from the interior of the bowl vertically through the milk chamber and arranged to discharge over the outer wall thereof the said pipe being bent or curved outward to pass the milk discharge pipe and having its upper end farther from the axis of rotation than the lower end.

4. The combination with the rotary skimmed milk chamber and with the arm 31 of the milk discharge pipe adjustably sustained by guides on the arm and longitudinally movable therein, a stop or shoulder on the pipe and a stop on the arm adjustable in the direction of the length of the pipe and arranged to engage the stop of the latter.

5. In a centrifugal creamer the combination with the supporting arm 31, provided with guides and with the pipe provided with the plate fixed to its side and adapted to slide in said guides, of a stop plate adjustable in a direction of the movement of the plate on the pipe and arranged to abut against the end of the same and prevent its accidental movement.

6. In a centrifugal creamer the combination with the rotary skimmed milk chamber and with the discharge pipe extending into the chamber in a circular direction, of an annular flange fixed near the receiving end of the pipe and inclined to the direction in which the pipe extends.

7. In a centrifugal creamer the combination of a rotary bowl formed with an upwardly extending conical bottom, a vertical driving shaft extending upward into said bottom and fixed thereto, a hollow feeding cone on the interior of the bowl at the top of the conical bottom, a nut sustained in the center of the cone by radial arms and screwed onto the driving shaft and a pipe leading from the interior of the cone downward along the exterior of the conical bottom and discharging into the base of the bowl.

8. In a centrifugal creamer the combination of the rotary bowl, the superposed milk chamber open at its inner side and fixed with respect to the bowl the frame or casing, a milk discharge pipe fixed with relation to the frame or casing and extending into the open side of the milk chamber, and a cream pipe fixed to the bowl and extending through the milk chamber outside of the axis of rotation.

In testimony whereof I hereunto set my hand, this 7th day of March, 1894, in the presence of two attesting witnesses.

A. H. REID.

Witnesses:
R. S. REED,
R. S. HOAGLAND.